(12) United States Patent
Asame (10) Patent No.: US 10,279,669 B2
(45) Date of Patent: May 7, 2019

(54) INTERNAL COMBUSTION ENGINE

(71) Applicant: HONDA MOTOR CO., LTD., Tokyo (JP)

(72) Inventor: Koichiro Asame, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 59 days.

(21) Appl. No.: 15/621,344

(22) Filed: Jun. 13, 2017

(65) Prior Publication Data

US 2017/0361695 A1 Dec. 21, 2017

(30) Foreign Application Priority Data

Jun. 17, 2016 (JP) .................. 2006-121213

(51) Int. Cl.
| | |
|---|---|
| *B60K 5/04* | (2006.01) |
| *B60K 5/12* | (2006.01) |
| *B62D 25/08* | (2006.01) |
| *F01M 11/00* | (2006.01) |
| *F01M 11/02* | (2006.01) |
| *F02B 75/22* | (2006.01) |

(52) U.S. Cl.
CPC ................. *B60K 5/12* (2013.01); *B60K 5/04* (2013.01); *B60K 5/1208* (2013.01); *B60K 5/1241* (2013.01); *B60K 5/1266* (2013.01); *B62D 25/082* (2013.01); *F01M 11/02* (2013.01); *F02B 75/22* (2013.01); *F01M 11/0004* (2013.01); *F01M 2011/023* (2013.01)

(58) Field of Classification Search
CPC .......... B60K 5/12; B60K 5/04; B60K 5/1208; B60K 5/1241; B60K 5/1266; B62D 25/082; F01M 11/02; F01M 11/0004; F01M 11/023; F02B 75/22
See application file for complete search history.

(56) References Cited

U.S. PATENT DOCUMENTS

| | | | | |
|---|---|---|---|---|
| 4,327,679 A | * | 5/1982 | Crouch .................... | B60K 5/12 123/195 C |
| 4,494,723 A | * | 1/1985 | Kobuki ................ | B60K 5/1208 180/312 |
| 5,035,397 A | * | 7/1991 | Yamada ............... | B60K 5/1208 180/297 |
| 5,218,938 A | * | 6/1993 | Miller ................ | F01M 11/0004 123/195 C |
| 5,245,961 A | * | 9/1993 | Miyakubo ............ | B60K 5/1216 123/195 C |

(Continued)

FOREIGN PATENT DOCUMENTS

| | | |
|---|---|---|
| JP | 2002266693 A | 9/2002 |
| JP | 5471368 B2 | 4/2014 |

*Primary Examiner* — Drew J Brown
(74) *Attorney, Agent, or Firm* — Armstrong Teasdale LLP (57) ABSTRACT

A pair of bracket fastening parts (7, 12, 91, 92, 121, 122, 161, 162) are provided on a side of the main body in an adjoining relationship, each bracket fastening part including a plurality of bosses (32 to 35, 72 to 75, 102 to 106, 132 to 137) arranged in a convex polygonal pattern and a plurality of ribs (37 to 42, 60, 80 to 84, 110 to 115, 140 to 146) connecting the bosses in a prescribed pattern. At least two of the bosses of one of the bracket fastening parts are shared by an adjoining one of the bracket fastening parts. Thereby, the engine can be adapted for multiple applications while minimizing an increase in the weight of the engine.

4 Claims, 6 Drawing Sheets

(56) References Cited

U.S. PATENT DOCUMENTS

| | | | | |
|---|---|---|---|---|
| 7,253,545 B2* | 8/2007 | Colgrove | ................ | B07B 1/42 |
| | | | | 209/634 |
| 7,617,811 B2* | 11/2009 | Neu | .................... | F02F 7/0046 |
| | | | | 123/195 A |
| 9,382,870 B2* | 7/2016 | Reinhart | ............... | F02F 7/0082 |
| 2005/0016474 A1* | 1/2005 | Dopke | .................... | F01N 5/02 |
| | | | | 123/54.4 |
| 2009/0277425 A1* | 11/2009 | Chisholm | ............. | F02M 39/00 |
| | | | | 123/509 |

* cited by examiner

INTERNAL COMBUSTION ENGINE

TECHNICAL FIELD

The present invention relates to an internal combustion engine, and in particular to an internal combustion engine having a main body provided with advantageous bracket fastening parts.

BACKGROUND ART

An internal combustion engine is provided with a main structural member or a main body such as a cylinder block and a cylinder head having a high stiffness, and the main body is typically provided with a bracket fastening part consisting of a rib extending in a circular or polygonal configuration and having a planar top surface. A plurality of threaded holes or stud bolts are provided along the rib. Each threaded hole or the stud bolt is surrounded by an annular projection (called as "boss") having a top surface flush with the top surface of the rib. Such a bracket fastening part provides a flat surface for securing auxiliary equipment or any other component part to the main body of the engine. In particular, an engine bracket for supporting the engine to the vehicle body is normally attached to such a bracket fastening part of the engine. See JP5471368B2 and JP2002-266693A, for instance.

In the automotive industry, a same engine may be mounted in different vehicle models, and in same models of different grades. In such a case, various associated items of auxiliary equipment or brackets may be required to be attached to the same engine in different ways. For this reason, the engine may be provided with a plurality of bracket fastening parts to accommodate for the different ways in which the auxiliary equipment or brackets may be attached to the engine. Therefore, it is often necessary to provide bracket fastening parts which may be partly redundant in some of the applications of the engine. This obvious adds to the weight of the vehicle. In particular, the bosses provided along the rib of each bracket fastening part contribute to the increase in weight.

SUMMARY OF THE INVENTION

In view of such a problem of the prior art, a primary object of the present invention is to provide an internal combustion engine having a plurality of bracket fastening parts so as to allow the engine to be used for multiple applications while minimizing an increase in the weight of the engine.

The present invention achieves such an object by providing an internal combustion engine comprising a main body (4) supported in an engine room (2) by a vehicle body via a bracket (8, 9, 10, 13), the engine main body comprising: at least a pair of bracket fastening parts (7, 12, 91, 92, 121, 122, 161, 162) on a side of the main body in an adjoining relationship, each bracket fastening part including a plurality of bosses (32 to 35, 72 to 75, 102 to 106, 132 to 137) arranged in a convex polygonal pattern and a plurality of ribs (37 to 42, 60, 80 to 84, 110 to 115, 140 to 146) connecting the bosses in a prescribed pattern; wherein at least two of the bosses of one of the bracket fastening parts are shared by an adjoining one of the bracket fastening parts.

The bracket fastening parts may not be always used for attaching brackets or other members, but may be intended to be used for attaching brackets depending on the applications of the engine. For instance, a pair of bracket fastening parts sharing bosses are provided on a side of a cylinder block, and only one of the bracket fastening parts may be used for attaching a bracket or any other member in a first application while the other bracket fastening part is used for attaching a bracket or any other member in a second application. Such a bracket is typically used for mounting the engine to a vehicle body.

By sharing some of the bosses between the adjoining bracket fastening parts, the weight of the engine main body can be reduced as compared to the case where the two bracket fastening parts are provided separately from each other.

The bosses (52, 53, 72, 73, 102, 103, 132, 133) shared by the two bracket fastening parts may be connected by a single rib (which may be linear or curved) or a pair of mutually parallel ribs (41, 42, 60, 76, 107) that are shared by the two bracket fastening parts.

Thereby, the stiffness of the bosses can be enhanced.

Preferably, the shared rib or ribs extend substantially orthogonally to a cylinder row direction of the engine.

Thereby, the stiffness of the engine main body with respect to flexural vibrational waves traveling in the vertical direction can be enhanced.

In a preferred embodiment of the present invention, the engine main body is provided with a vertically extending projection (23) internally defining a vertical passage, and the shared rib or ribs extend in an overlapping relationship with the vertically extending projection.

Thereby, the shared rib or ribs can share the material of the engine maim body with the vertically extending projection so that the material of the engine main body can be saved, and the weight of the engine can be reduced.

The internally defined vertical passage defined in the vertically extending projection (23) comprises an oil return passage communicating a valve actuating chamber with an oil reservoir of the engine.

As the oil return passage is provided between each pair of adjoining cylinders, the vertically extending projection can be aligned with the rib or ribs.

The engine main body is provided with a laterally extending projection (26), and at least one of the ribs aligns with the laterally extending projection.

Thereby, the material of the engine main body may be saved without reducing the bending stiffness of the engine main body.

A plurality of bracket fastening parts may be provided in an internal combustion engine in such a manner the engine can be adapted for multiple applications while minimizing an increase in the weight of the engine.

Embodiments of the present invention is described in the following with reference to appended drawings. The directions mentioned in the following disclosure will be based on the view point of a vehicle operator.

FIRST EMBODIMENT

Figure 1:
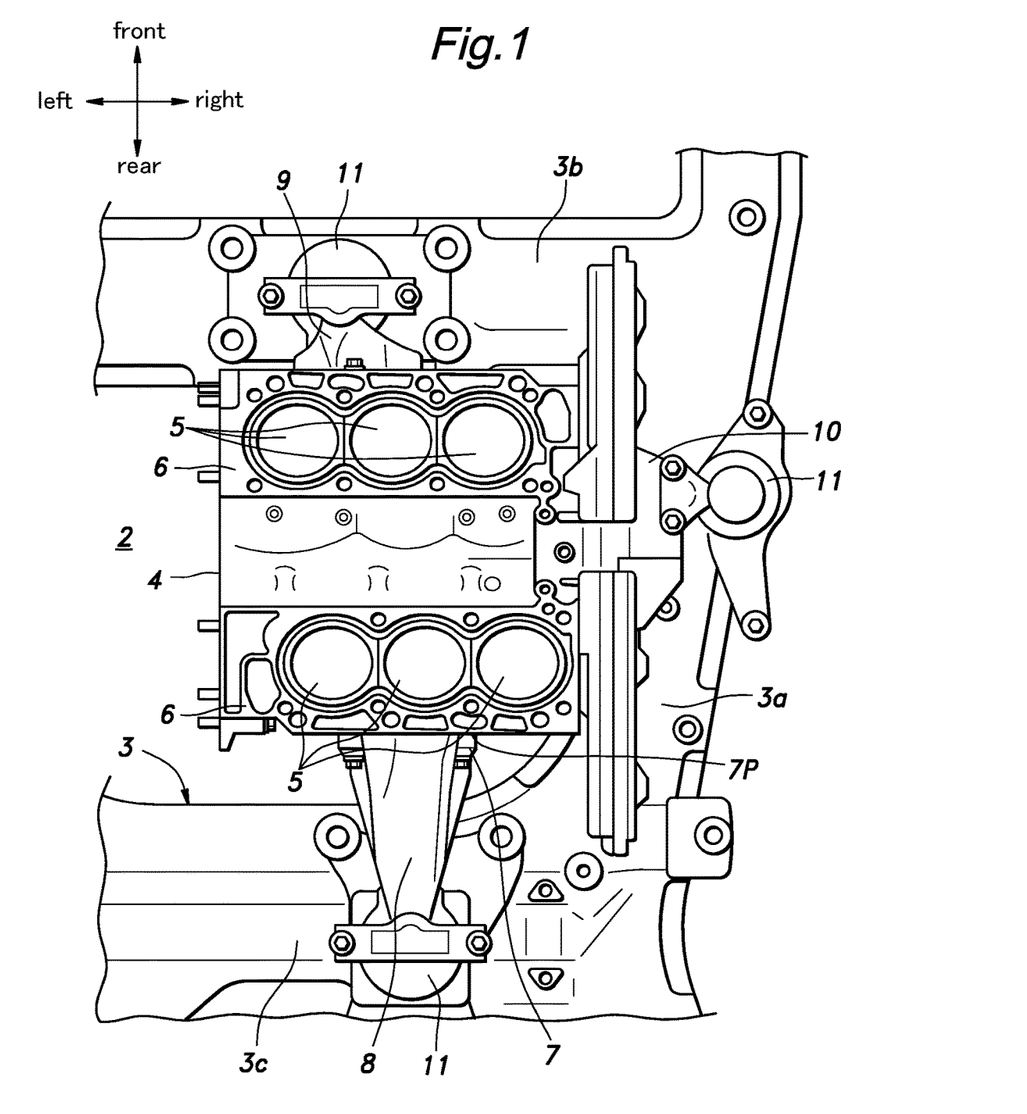
FIG. 1 is a plan view of a cylinder block of an engine of a first embodiment of the present invention mounted on a vehicle body by using brackets arranged in a first pattern.

Referring to FIG. 1, an engine of a first embodiment of the present invention consists of a six-cylinder V engine which includes a main body supported by a vehicle body inside an engine room 2 via a sub frame 3. The sub frame 3 includes a right side member 3a, a left side member (not shown in the drawings), a front cross beam 3b and a rear cross beam 3c.

The engine main body includes a cylinder block 4 having a pair of cylinder banks 6 located one behind the other and each defining three cylinders 5.

The cylinder block 4 is supported by the sub frame 3 via three brackets 8, 9 and 10. One end of the first bracket 8 is attached to a first bracket fastening part 7 provided centrally on the rear side of the cylinder block 4. The planar mating surface of the fastening part 7 is denoted with numeral 7P. The other end of the first bracket 8 extends rearwardly, and is attached to the rear cross beam 3c via a vibration insulator 11 which may consist of a spring or rubber material, and may also be filled with liquid. The vibration insulator 11 may also consist of an active vibration insulator.

One end of the second bracket 9 is attached to a front side of the cylinder block 4, and the other end of the second bracket 9 is attached the front cross beam 3b via a vibration insulator 11.

One end of the third bracket 10 is attached to a right side of the cylinder block 4, and the other end of the third bracket 10 is attached the right side member 3a via a vibration insulator 11.

The vibrations of the engine are transmitted to the sub frame 3. The vibration insulators 11 which in the illustrated embodiment consist of passive vibration insulators have a resonance frequency lower than the lowest basic vibration frequency of the engine.

Depending on the positioning of the steering (right hand side drive or left hand side drive), the positioning of the exhaust system and the configuration of the sub frame 3, the positions of the brackets 8, 9 and 10 may vary. For instance, the layout shown in FIG. 2 differs from that shown in FIG. 1 in the positioning of the first bracket 12 (rear bracket) which in this case is positioned in a right end part of the rear side of the cylinder block 4. In this case also, one end of the first bracket 12 is attached to a first bracket fastening part 13 provided centrally on the rear side of the cylinder block 4. The planar mating surface of the fastening part 13 is denoted with numeral 13P. The other end of the first bracket 12 extends rearwardly, and is attached to the rear cross beam 3c via a vibration insulator 11.

Figure 3:
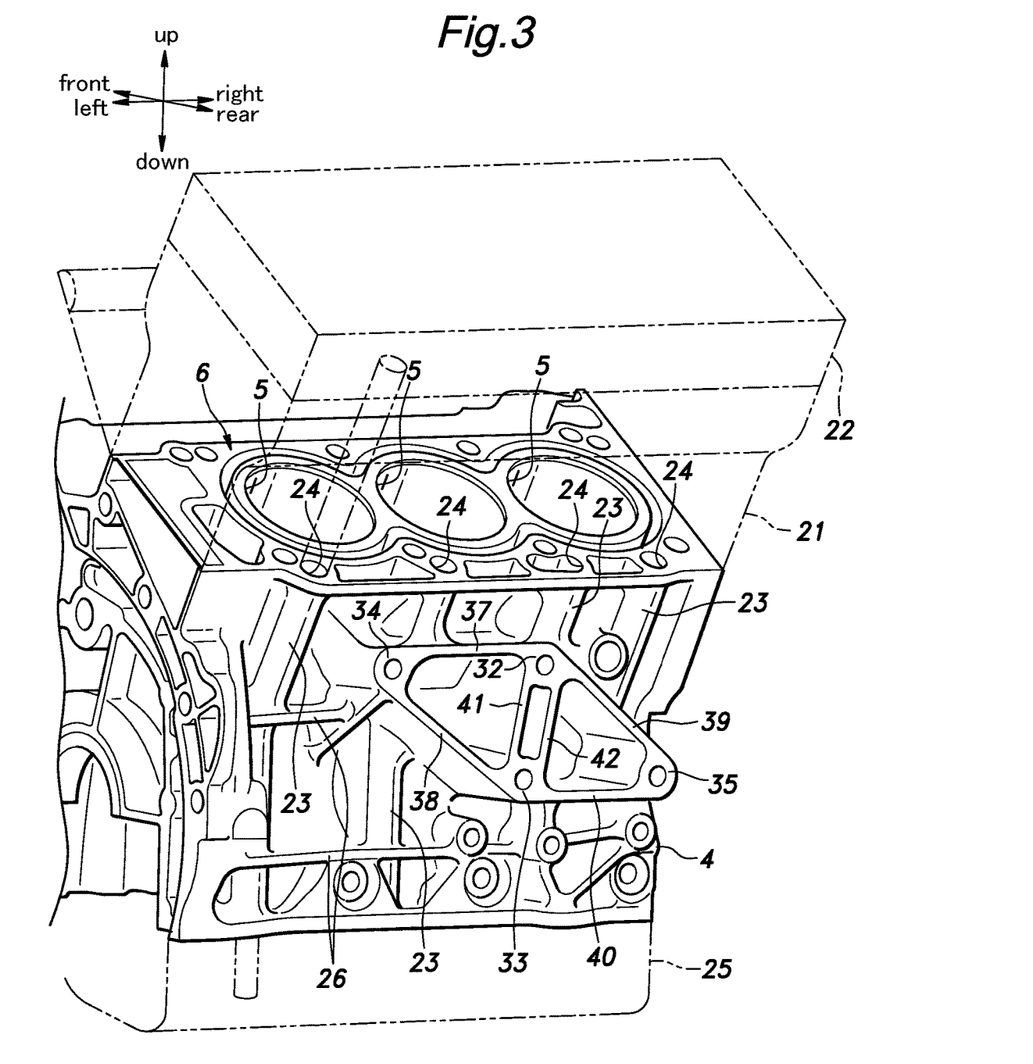
FIG. 3 is a perspective view of the cylinder block.

As shown in FIG. 3, a cylinder head 21 is fastened to the upper surface of each cylinder bank 6 of the cylinder block 4 via a gasket, and a cylinder head cover 22 is attached to the upper surface of the cylinder head 21. The valve actuating chamber is defined between the cylinder head 21 and the cylinder head cover 22, and accommodates a valve actuating mechanism including camshafts and rocker arms. An oil pan 25 is attached to the lower end of the cylinder block 4. Four vertically extending projections 23 are formed on the rear surface of the cylinder block 4, and each internally defines a return passage for returning the oil from the valve actuating chamber to an oil reservoir in the oil pan 25. The rear surface of the cylinder block 4 is also formed with laterally extending projections 26 for the purpose of increasing the bending stiffness of the cylinder block 4.

Figure 4:
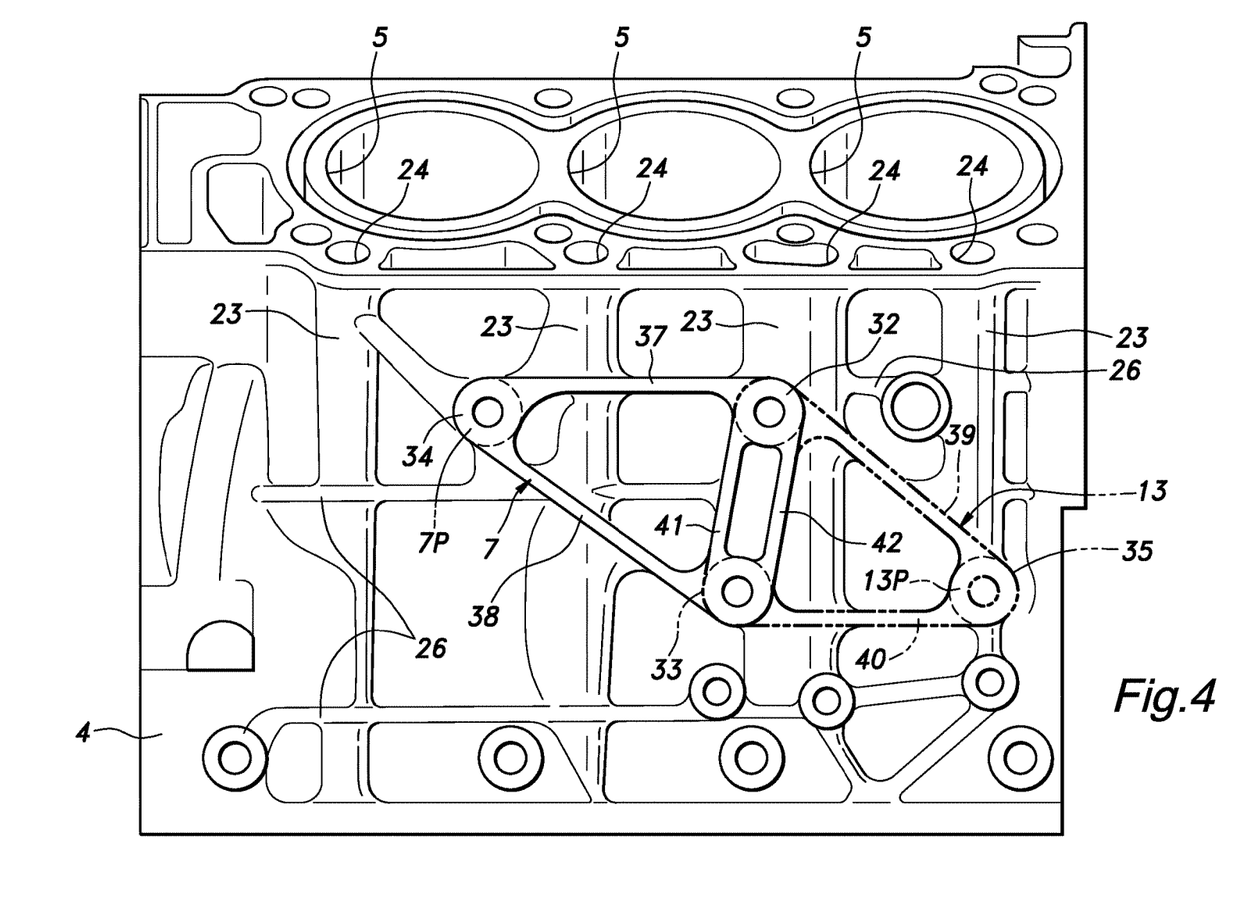
FIG. 4 is a rear view of the cylinder block.

As shown in FIGS. 3 and 4, four bosses 32 to 35 project from the rear side of the cylinder block 4, each boss being centrally formed with a threaded hole. Alternatively, a stud bolt may project centrally from each boss. The four bosses 32 to 35 have a substantially same outer diameter. The rear side of the cylinder block 4 is formed with four vertically extending projections 23 each internally defining a passage (for conducting oil from the valve actuating chamber in the cylinder head to the oil pan). These projections 23 are formed in the two end parts (with respect to the cylinder row direction) and between the adjoining cylinders.

The first boss 32 is formed (substantially centrally) on the projection 23 located between the right cylinder 5 and the middle cylinder 5 in FIG. 4, and the second boss 33 is formed below the first boss 32 and slightly offset to the left (in FIG. 4) so as to be positioned on a left part of the same projection 23. The first boss 32 is provided also on a laterally extending projection 26 formed on the surface of the cylinder block 4 for increasing the bending stiffness of the cylinder block 4.

The third boss 34 is formed substantially at the same elevation (in FIG. 4) as the first boss 32 and between the two vertically extending projections 23 located on the left end part of the cylinder block 4 and between the left cylinder 5 and the middle cylinder 5, respectively. Similarly as the first boss 32, the third boss 34 is provided on the laterally extending projection 26.

The fourth boss 35 is formed substantially at the same elevation (in FIG. 4) as the second boss 33 and on the vertically extending projections 23 located on the right end part of the cylinder block 4.

The first and second bosses 32 and 33 are connected to each other via a pair of mutually parallel ribs 41 and 42 which may be referred to as central ribs 41 and 42. The outer profile of the central ribs 41 and 42 defines a track shape jointly with the outer profiles of the first boss 32 and the second boss 33. Therefore, the distance between the outer profiles of the central ribs 41 and 42 is equal to the diameter of the first and second bosses 32 and 33, and the line connecting the centers of the first and second bosses 32 and 33 is parallel to the central ribs 41 and 42.

The first boss 32 is connected to the third boss 34 via a first rib 37, and the third boss 34 is connected to the second boss 33 via a second rib 38. The first boss 32 is also connected to the fourth boss 35 via a third rib 39, and the fourth boss 35 is connected to the second boss 33 via a fourth rib 40. All of these ribs 37 to 42 are linear in shape, and the outer profile of each rib merges with each associated boss in a tangential direction. The inner profiles of the adjoining ribs are smoothly connected to each other along an arcuate trajectory that passes tangentially along the outer periphery of the boss interposed between the adjoining ribs.

The top surfaces of the bosses and the ribs are flush to one another. Alternatively, the top surfaces of the bosses are flush to one another, but the top surfaces of the ribs are recessed relative to the top surfaces to the bosses. The first to fourth ribs 37 to 40 thus extend in a parallelepiped pattern, and a rectangular recess is defined between the central ribs 41 and 42.

In a first application of the engine shown in FIG. 4, the first bracket 8 is attached to the cylinder block 4 at the first boss 32, the second boss 33 and the third boss 34 by threaded bolts threaded into the threaded holes formed in these bosses. Thus, the first boss 32, the second boss 33 and the third boss 34 serve as the first bracket fastening part 7 in cooperation with the central ribs 41 and 42 (or one of the central ribs 41 and 42), the first rib 37 and the second rib 38.

The top surfaces of the first boss 32, the second boss 33, the third boss 34, the central ribs 41 and 42 (or one of the central ribs 41 and 42), the first rib 37 and the second rib 38 jointly define the first bracket mating surface 7P.

Figure 5:
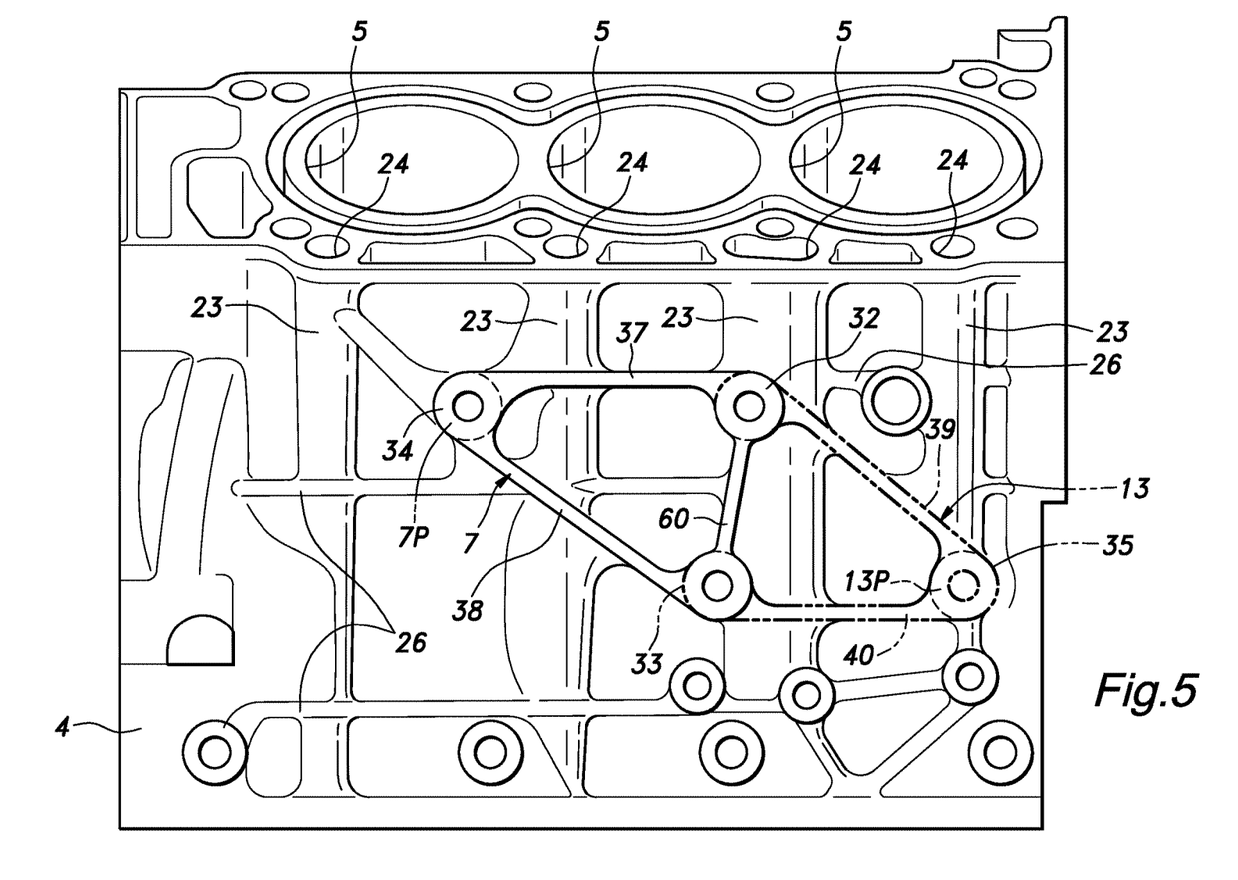
FIG. 5 is a rear view of a cylinder block of a second embodiment.

In a second application of the engine shown in FIG. 5, the first bracket 12 is attached to the cylinder block 4 at the first boss 32, the second boss 33 and the fourth boss 35 by threaded bolts threaded into the threaded holes formed in these bosses. Thus, the first boss 32, the second boss 33 and the fourth boss 35 serve as the second bracket fastening part 13 in cooperation with the central ribs 41 and 42 (or one of the central ribs 41 and 42), the third rib 39 and the fourth rib 40.

The top surfaces of the first boss 32, the second boss 33, the fourth boss 35, the central ribs 41 and 42 (or one of the central ribs 41 and 42), the first rib 37 and the second rib 38 jointly define the second bracket mating surface 13P.

Thus, the first boss 32 and the second boss 33 belong to both the first bracket fastening part 7 and the second bracket fastening part 13, and therefore serve as common bosses for the first bracket fastening part 7 and the second bracket fastening part 13.

Figure 2:
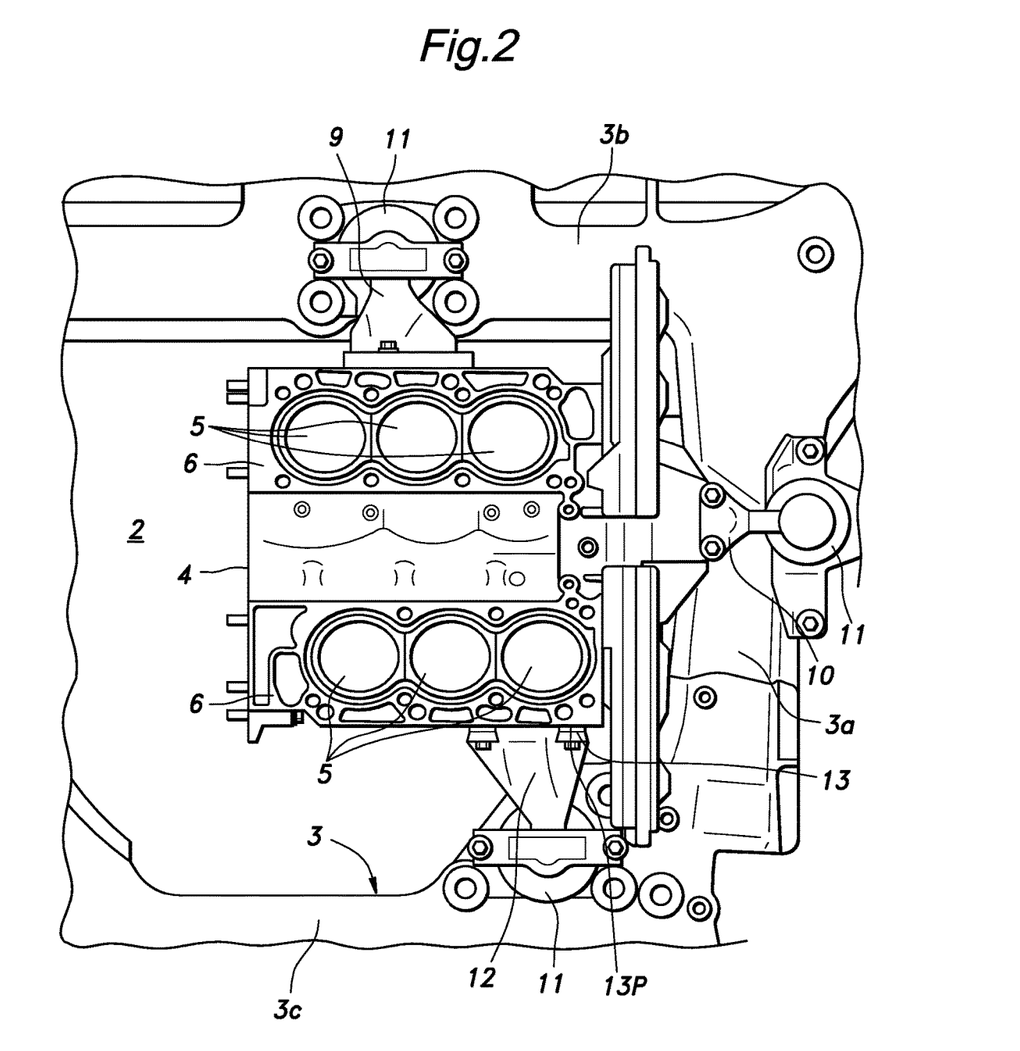
FIG. 2 is a plan view of the cylinder block of the engine of a first embodiment of the present invention mounted on a vehicle body by using brackets arranged in a second pattern.

The advantages and the mode of use of the engine described above are discussed in the following. Although a common cylinder block 4 is used, the engine may be configured for the first application by attaching an end of the first bracket 8 to the first bracket fastening part 7 as shown in FIGS. 1 and 4, and for the second application by attaching an end of the first bracket 12 to the second bracket fastening part 13 as shown in FIGS. 2 and 4.

Since the first boss 32, the second boss 33 and the central ribs 41 and 42 can be used for both the first application and the second application, the weight of the cylinder block 4 is reduced as compared to the case where the two bracket fastening parts are provided separately from each other without any common bosses or ribs.

FIG. 5 shows a second embodiment of the present invention in which a single central rib 60 extends between the first boss 32 and the second boss 33, instead of the two parallel central ribs 41 and 42. The central rib 60 may be provided with a required bending stiffness by appropriately selecting the width thereof. This embodiment is otherwise similar to the first embodiment, and the parts corresponding to those of the first embodiment are denoted with like numerals in FIG. 5 without necessarily repeating the description of such parts.

In each of the first and second embodiments, since the central rib 41 and 42 or the central rib 50 are provided so as to overlap with the corresponding vertically extending projection 23, the weight of the cylinder block 4 can be reduced or the material of the cylinder block 4 can be reduced as compared to the case where the central rib 41 and 42 or the central rib 50 are provided separately from any of the vertically extending projections 23.

As the first boss 32 and the second boss 33 are vertically spaced from each other, and are substantially aligned with each other along a vertical line, the first bracket 8, 13 provides a high resistance against the tilting of the cylinder block 4 around a lateral line.

The part of the first bracket 8 attached to the rear cross beam 3c substantially aligns with a laterally central part of the first rib 37 (or the second rib 38). Similarly, the part of the first bracket 12 attached to the rear cross beam 3c substantially aligns with a laterally central part of the fourth rib 40 (or the third rib 39). Therefore, in either case, the moment applied to the first bracket 8 or 12 due to the vibration of the engine can be minimized.

THIRD EMBODIMENT

Figure 6A:
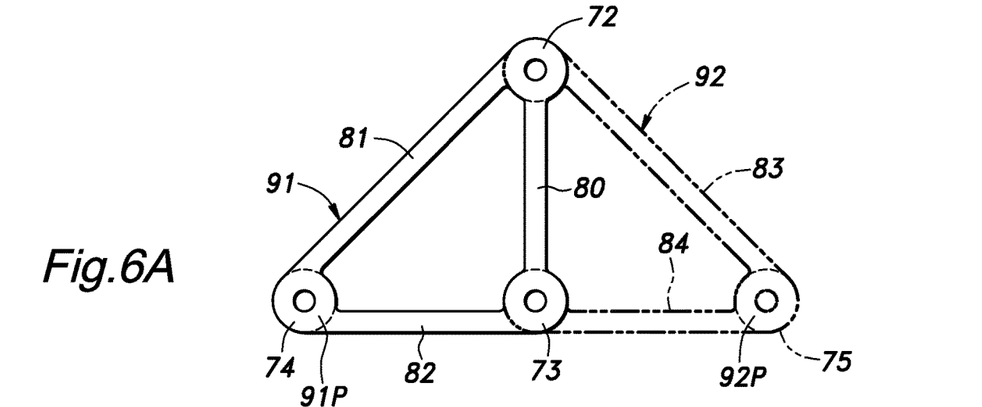
FIG. 6a is a rear view of a bracket fastening part of a third embodiment.

FIG. 5a shows a third embodiment of the present invention. In this case, there are four bosses 72 to 75. The first boss 72 and the second boss 73 are provided on the rear side of the cylinder block 4 in a vertically aligned and spaced apart relationship. The third boss 74 and the fourth boss 75 are formed in a laterally aligned and equally spaced apart relationship relative to the second boss 73 on either side thereof. A central rib 76 extends between the first and second bosses 72 and 73. A first rib 81 extends between the first boss 72 and the third boss 74, and a second rib 82 extends between the second boss 73 and the third boss 74. A third rib 83 extends between the first boss 72 and the fourth boss 75, and a fourth rib 84 extends between the second boss 73 and the fourth boss 75.

The first boss 72, the second boss 73 and the third boss 74 form a first bracket fastening part 91 in cooperation with the central rib 80, the first rib 81 and the second rib 82. The first boss 72, the second boss 73 and the fourth boss 75 jointly form a second bracket fastening part 92 in cooperation with the central rib 80, the third rib 83 and the fourth rib 84.

The first boss 72, the second boss 73, the third boss 74, the central rib 76, the first rib 81 and the second rib 82 jointly form a first bracket mating surface 91P. The first boss 72, the second boss 73, the fourth boss 75, the central rib 76, the third rib 83 and the fourth rib 84 jointly form a second bracket mating surface 92P.

In this embodiment also, the first boss 72 and the second boss 73 are shared by the first bracket fastening part 91 and the second bracket fastening part 92, and the central rib 76 is shared by the first bracket fastening part 91 and the second bracket fastening part 92. Therefore, the cylinder block 4 is provided with the two bracket fastening parts 91 and 92 sharing the two bosses 72 and 73 and the central rib 76 so that the weight of the cylinder block 4 can be minimized.

FOURTH EMBODIMENT

Figure 6B:
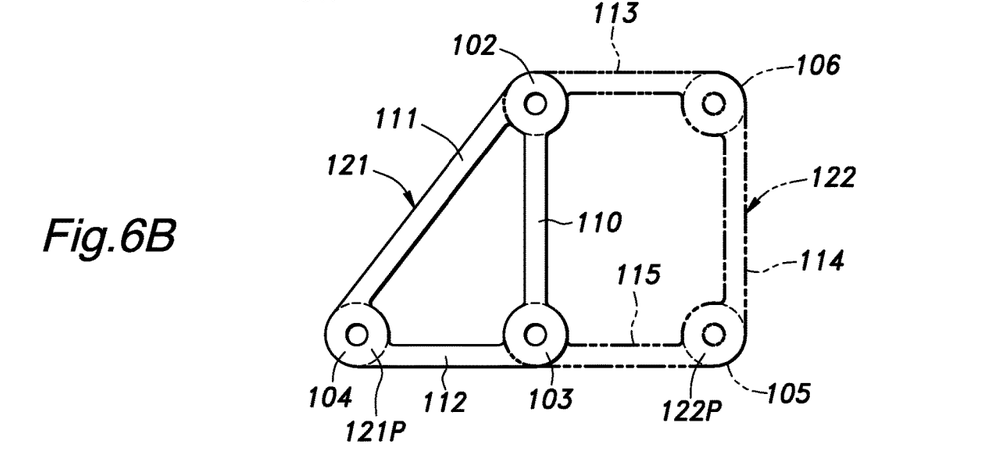
FIG. 6b is a rear view of a bracket fastening part of a fourth embodiment.

FIG. 5b shows a fourth embodiment of the present invention. In this case, there are five bosses 102 to 106. The first boss 102 and the second boss 103 are provided on the rear side of the cylinder block 4 in a vertically aligned and mutually spaced apart relationship. The third boss 104 and the fourth boss 105 are formed in a laterally aligned and equally spaced apart relationship to the second boss 103 on either side thereof. The fifth boss 106 is provided in a laterally aligned relationship to the first boss 102 and in a vertically aligned relationship to the fourth boss 105. A central rib 110 extends between the first and second bosses 102 and 103. A first rib 111 extends between the first boss 102 and the third boss 104, and a second rib 112 extends between the second boss 103 and the third boss 104. A third rib 113 extends between the first boss 102 and the fifth boss 106, a fourth rib 114 extends between the fifth boss 106 and the fourth boss 105, and a fifth rib 115 extends between the second boss 103 and the fifth boss 105.

The first boss 102, the second boss 103 and the third boss 104 form a first bracket fastening part 121 having a triangular configuration in cooperation with the central rib 110, the first rib 111 and the second rib 112. The first boss 102, the second boss 103, the fourth boss 105 and the fifth boss 106 jointly form a second bracket fastening part 122 having a rectangular configuration in cooperation with the central rib 110, the third rib 113, the fourth rib 114 and the fifth rib 115.

The first boss 102, the second boss 103, the third boss 104, the central rib 110, the first rib 111 and the second rib 112 jointly form a first bracket mating surface 121P. The first boss 102, the second boss 103, the fourth boss 105, the fifth boss 106, the central rib 110, the third rib 113, the fourth rib 114 and the fifth rib 115 jointly form a second bracket mating surface 122P.

In this embodiment also, the first boss 102 and the second boss 103 are shared by the first bracket fastening part 121 and the second bracket fastening part 122, and the central rib 110 is shared by the first bracket fastening part 121 and the second bracket fastening part 122. Therefore, the cylinder block 4 is provided with the two bracket fastening parts 121 and 122 sharing the two bosses 102 and 103 and the central rib 110 so that the weight of the cylinder block 4 can be minimized.

FIFTH EMBODIMENT

Figure 6C:
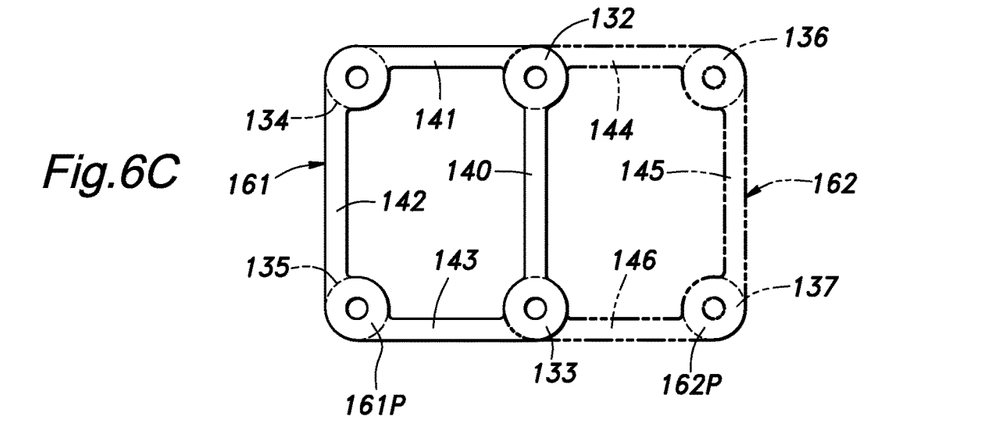
FIG. 6c is a rear view of a bracket fastening part of a fifth embodiment.

FIG. 5c shows a fifth embodiment of the present invention. In this case, there are six bosses 132 to 137. The first boss 132 and the second boss 133 are provided on the rear side of the cylinder block 4 in a vertically aligned and mutually spaced apart relationship. The third boss 134 and the fifth boss 136 are formed in a laterally aligned and equally spaced apart relationship to the first boss 132 on either side thereof. The fourth boss 135 and the sixth boss 137 are formed in a laterally aligned and equally spaced apart relationship to the second boss 133 on either side thereof. The third boss 134 and the fourth boss 135 are vertically aligned with each other, and the fifth boss 136 and the sixth boss 137 are also vertically aligned with each other. A central rib 140 extends between the first and second bosses 132 and 133. A first rib 141 extends between the first boss 132 and the third boss 134, a second rib 142 extends between the third boss 134 and the fourth boss 135, a third rib 143 extends between the second boss 133 and the fourth boss 135. A fourth rib 144 extends between the first boss 132 and the fifth boss 136, a fifth rib 145 extends between the fifth boss 136 and the sixth boss 137, and a sixth rib 146 extends between the second boss 133 and the sixth boss 137.

The first boss 132, the second boss 133, the third boss 134 and the fourth boss 135 form a first bracket fastening part 161 having a rectangular configuration in cooperation with the central rib 140, the first rib 141, the second rib 142, and the third rib 143. The first boss 132, the second boss 133, the fifth boss 136 and the sixth boss 137 jointly form a second bracket fastening part 162 having a rectangular configuration in cooperation with the central rib 140, the fourth rib 144, the fifth rib 145 and the sixth rib 146.

The first boss 132, the second boss 133, the third boss 134, the fourth boss 135, the central rib 140, the first rib 141, the second rib 142 and the third rib 143 jointly form a first bracket mating surface 121P. The first boss 132, the second boss 133, the fifth boss 136, the sixth boss 137, the central rib 140, the fourth rib 144, the fifth rib 145 and the sixth rib 146 jointly form a second bracket mating surface 162P.

In this embodiment also, the first boss 132 and the second boss 133 are shared by the first bracket fastening part 161 and the second bracket fastening part 162, and the central rib 140 is shared by the first bracket fastening part 161 and the second bracket fastening part 162. Therefore, the cylinder block 4 is provided with the two bracket fastening parts 161 and 162 sharing the two bosses 132 and 133 and the central rib 140 so that the weight of the cylinder block 4 can be minimized.

In the first and second embodiments, only the first rib 37 was provided on the laterally extending projection 26 projecting from the surface of the cylinder block 4 for the purpose of increasing the bending stiffness thereof, but the fourth rib 40 may also be provided on such a laterally extending projection 26. The vertically extending projection 23 which aligned with the central ribs 41 and 42 or the central rib 60 in the first and second embodiments internally defined an oil return passage, but may also consist of a solid vertical rib provided for the purpose of increasing the bending stiffness of the cylinder block 4, or may internally define any other passage such as a breather passage and a cooling water passage.

In the first and second embodiments, the central ribs 41 and 42 or the central rib 60 that are shared by the two bracket fastening parts 7 and 12 extended in the vertical direction so that the two bracket fastening parts were positioned laterally one next the other. However, it is also possible to arrange the two bracket fastening parts vertically one above the other by providing a central rib or central ribs that extend in the lateral direction.

The foregoing embodiments provided a pair of bracket fastening parts that share the bosses, but three or more bracket fastening parts may be provided on a side surface of an engine so as to share bosses between the adjoining bracket fastening parts without departing from the spirit of the present invention.

Although the present invention has been described in terms of a preferred embodiment thereof, it is obvious to a person skilled in the art that various alterations and modifications are possible without departing from the scope of the present invention.

The invention claimed is:

1. An internal combustion engine comprising a main body supported in an engine room by a vehicle body via a bracket, the engine main body comprising:
   at least a pair of bracket fastening parts on a side of the main body in an adjoining relationship, each bracket fastening part including a plurality of bosses arranged in a convex polygonal pattern and a plurality of ribs connecting the bosses in a prescribed pattern,
   wherein the bosses include a first boss and a second boss that are substantially aligned with each other along a vertical line, a third boss provided on a left end part of the cylinder block, and a fourth boss provided on a right end part of the cylinder block,
   wherein one of the bracket fastening parts is formed by the first, second, and third bosses, and the other bracket fastening part is formed by the first, second, and fourth bosses.

2. The internal combustion engine according to claim 1, wherein the bosses shared by the two bracket fastening parts are connected by a single rib or a pair of mutually parallel ribs that are shared by the two bracket fastening parts.

3. The internal combustion engine according to claim 2, wherein the engine main body is provided with a vertically extending projection internally defining a vertical passage, and the shared rib or ribs extend in an overlapping relationship with the vertically extending projection.

4. The internal combustion engine according to claim 3, wherein the internally defined vertical passage defined in the vertically extending projection comprises an oil return passage communicating a valve actuating chamber with an oil reservoir of the engine.

\* \* \* \* \*